(12) United States Patent  
Gaudet

(10) Patent No.: US 6,414,229 B1  
(45) Date of Patent: Jul. 2, 2002

(54) PORTABLE ELECTRONIC EAR-TRAINING APPARATUS AND METHOD THEREFOR

(75) Inventor: Samuel Gaudet, Moncton (CA)

(73) Assignee: Samgo Innovations Inc., Moncton (CA)

( * ) Notice: Subject to any disclaimer, the term of this patent is extended or adjusted under 35 U.S.C. 154(b) by 0 days.

(21) Appl. No.: 09/885,119

(22) Filed: Jun. 21, 2001

Related U.S. Application Data

(60) Provisional application No. 60/255,061, filed on Dec. 14, 2000.

(51) Int. Cl.$^7$ ............................................. G09B 15/06
(52) U.S. Cl. ...................................... 84/465; 84/470 R
(58) Field of Search ...................... 84/465–467, 470 R

(56) References Cited

U.S. PATENT DOCUMENTS

| | | | | |
|---|---|---|---|---|
| 4,089,246 A | * | 5/1978 | Kooker .................... | 84/470 R |
| 4,178,823 A | * | 12/1979 | McCoskey et al. | |
| 4,203,345 A | | 5/1980 | Collin et al. .................... | 84/478 |
| 4,213,372 A | | 7/1980 | Sasaki et al. ............. | 84/470 R |
| 4,321,853 A | * | 3/1982 | Tumblin | |
| 4,336,935 A | * | 6/1982 | Goldfarb | |
| 4,480,521 A | * | 11/1984 | Schmoyer ................. | 84/478 X |
| 4,781,099 A | * | 11/1988 | Koike ...................... | 84/470 R |
| 5,287,789 A | * | 2/1994 | Zimmerman .............. | 84/477 R |
| 5,405,153 A | * | 4/1995 | Hauck ................... | 84/470 R X |
| 5,544,562 A | * | 8/1996 | Jeon .......................... | 84/470 R |
| 5,565,641 A | * | 10/1996 | Gruenbaum | |
| 6,215,057 B1 | * | 4/2001 | Oren-Chazon ............ | 84/470 R |

FOREIGN PATENT DOCUMENTS

| | | |
|---|---|---|
| CA | 2297518 | 8/2000 |

* cited by examiner

*Primary Examiner*—Jeffrey Donels  
(74) *Attorney, Agent, or Firm*—Jacobson Holman, PLLC

(57) ABSTRACT

A portable electronic device and method therefor provide a user with all the high quality synthesized instruments associated with a computer software ear-training method, along with some additional unique features. Such features include the provision of: an infinite number of randomly generated exercises; perfect pitch exercises; randomly generated, musically correct (mathematically calculated) chord progressions; full control of the level of difficulty of the exercises; testing capability, including correcting the answers given by the user; and a choice of 127 different MIDI instruments in this novel musical teaching aid. All of these features are provided in a portable, inexpensive, aesthetically pleasing device that can fit in the palm of one's hand. The device of the present invention can be employed by any musician to practice any of the following musical exercises: recognizing notes, intervals, chords (triads and sevenths), scale degrees, chord progressions and melodic and harmonic dictation.

20 Claims, 4 Drawing Sheets

PORTABLE ELECTRONIC EAR-TRAINING APPARATUS AND METHOD THEREFOR

This appln claims benefit of Prov. No. 60/255,061 filed Dec. 14, 2000.

FIELD OF THE INVENTION

The present invention relates to a device used to assist in musical ear training. The present invention also relates to an electronic device in the class of portable dictionaries or language translators as well as portable mini-computers.

BACKGROUND OF THE INVENTION

The ability among musicians to recognize musical elements such as notes, intervals, chords, scales, melodies, rhythms and chord progressions is extremely important. In fact, ear-training courses are obligatory in most university music programs and are considered essential in a musician's training. The traditional method used to train the ear is relatively obvious: a professor (for example) plays something on an instrument and the students write down what they hear. This method is most commonly used in classrooms or by a group of musicians studying together.

One type of prior art ear-training aid comes in the form of cassettes or compact discs (CDs) which are usually accompanied by an instruction or exercise manual and a finite number of ear-training exercises. Most of these exercises are relative pitch exercises where musical elements are recognized in a relative way with respect to some reference. (Recognizing a note by itself without reference is called an absolute pitch exercise; a musician capable of recognizing musical elements in an absolute sense is said to have perfect pitch.)

An example of such an ear-training aid is found in Canadian Patent Application number 2,297,518, by Waind, laid open on Aug. 2, 2000, and entitled "Ear training method". In Waind, an audio CD contains many tracks, each track having three segments. In the first segment is recorded a musical chord; in the second, a pause period of silence; in the third, a voice announcement of the correct answer as to what was played in the first segment. The CD is played in random-mode in a CD player. The system provides drills that teach music students to identify and recognize chords and notes by their sound. The system as disclosed in Wain, however, is limited to fixed exercises and changes cannot be made in order to customize or change the pre-set exercises, thereby affording only limited teaching content.

In recent years, computer software has been available for musicians who wish to (or are obliged to) study alone. Many systems known in the prior art attempt to address the drawbacks of these traditional computer/synthesizer apparatuses used to assist with musical ear training. U.S. Pat. No. 5,544,562 issued to Jeon on Aug. 13, 1996, teaches an apparatus for practicing playing an electronic musical instrument. This apparatus helps a student learning to play an electronic keyboard by displaying the musical score (notes and rhythmic values of a melody) of a selected piece of music on an LCD display and identifying, with lights, which keys have to be pressed to play the displayed melody; it can also test whether the user is pressing the right keys when a score is displayed. This apparatus is helpful in learning to play the keyboard, but is not meant to provide direct ear training exercises. Furthermore, it is necesesary to use this apparatus in conjunction with a keyboard.

However, an arrangement for using such computer software requires both a computer and a synthesizer, since high quality sound is not yet possible with current sound cards in computers. Many music departments or schools have music laboratories with fully functional computer/synthesizer arrangements where students can reserve times of exclusive access to the equipment. Such arrangements lack portability since the student is restricted to the computer laboratory. Furthermore, the price is prohibitive for most students to acquire such an arrangement for themselves.

U.S. Pat. No. 4,781,099 issued to Koike on Nov. 1, 1988, teaches a musical quiz apparatus. The apparatus generates a sound that corresponds to a chord; subsequently, the user tries to press the right keys on a keyboard that would play that chord on a piano. This apparatus also corrects the user's answers. Although this apparatus does not require a separate keyboard, it is still quite large because of its own keyboard keys. Also, this apparatus can only be used by keyboard players to recognize or practice chords.

U.S. Pat. No. 5,405,153 issued to Hauck on Apr. 11, 1995, discloses a musical electronic game that initially plays a melodic sequence as a preview; then, when the game starts, a much longer melody is played which contains the previewed sequence. Scores are given if the user correctly identifies the occurrence of the previewed sequence during the playing of the longer melody. Although memorizing a melody (or part of a melody) is part of ear training, this device does not provide the opportunity to identify the melodic elements being played and does not play notes alone or intervals alone or chords, as is the case in ear training exercises.

U.S. Pat. No. 4,203,345 issued to Collin et al. on May 20, 1980, teaches an automatic visual teaching device for the learning of music or component parts thereof. A plurality of actuable switches is provided in order to visually display a desired coded chord. Although this apparatus is relatively more portable than others because of its lack of piano keys, it can only be used by keyboard players and can only be used to recognize chords In contrast, some prior art systems have attempted to avoid the need for the use of a separate musical keyboard, or the limitation of instruction only those musicians who play the keyboard. U.S. Pat. No. 4,213,372 issued to Sasaki et al. on Jul. 22, 1980, describes an electronic type music learning aid including an input unit for the introduction of musical information such as duration and pitch of a tone, etc., in a digital fashion; a storage to and from which digital information can be written and read in sequence; a musical note display which provides a visual display of digital information read from the storage; and a sound generator which produces sounds in response to the digital information provided from the storage. U.S. Pat. No. 4,089,246 issued to Kooker on May 16, 1978, teaches a musical rhythm-tempo tutoring device which is similar to the Sasaki et al. patent. For example, the user inputs musical note durations and tempos that correspond to a melody by use of a keyboard. The apparatus then replays tones of the melody with the tempo and rhythmic values entered, thus providing an example of the melody or a tutoring that helps the user play the melody on his or her instrument. Lights are also used to give a visual aid to retaining the played rhythms and tempos.

Although these prior patents teach the selection and repetition of rhythm values and tempos using a keyboard, the apparatuses described do not quiz the user to identify the musical elements played and therefore do not truly provide ear training.

SUMMARY OF INVENTION

Accordingly, it is an object of the present invention to provide a portable electronic ear-training device that provides numerous features not found in traditional portable apparatuses. Such features include the provision of: an infinite number of randomly generated exercises; perfect pitch exercises; randomly generated, musically correct (mathematically calculated) chord progressions; full control of the level of difficulty of the exercises; testing capability (corrects the answers given by the user); and a choice of 127 different MIDI instruments in this novel musical teaching aid. All of these features are provided in a portable, aesthetically pleasing device that can fit in the palm of one's hand.

According to an aspect of the invention, there is provided a portable electronic musical device comprising: a housing; a processor contained within said housing for providing randomly generated customizable interactive music ear-training exercises to a user; input means connected to said processor and located on an exterior surface of said housing for receiving the user's input selections; sound generating means connected to said processor for generating sounds to be used in said exercises; and display means located on an exterior surface of said housing for displaying musical exercise information.

Another aspect of the invention provides a method of musically ear training a user by way of a portable electronic musical device as described in the paragraph above, the method comprising the steps of: providing, by way of said processor, a plurality of customizable interactive musical exercises for selection by a user; receiving, by way of said input means, user-defined options related to a selected musical exercise; playing the selected musical exercise on the device by way of said sound generating means; prompting the user, by way of said display means, for an answer to the musical exercise; and providing the correct answer to the musical exercise to the user by way of said display means.

In another particular aspect of the invention, there is provided a portable electronic device for providing randomly generated customizable interactive music ear-training exercises, comprising: a housing having a keypad mounted on an upper surface thereof, a digital display located on said upper surface, and an electronic circuit board contained within said housing, said electronic circuit board comprising: a musical instrument digital interface chip for generating sounds to be used in musical exercises, a microprocessor, an amplifier, and a piggyback board for interpreting a user's keypad selections. The electronic circuit board also comprises an earphone jack, an ac-adapter plug, and a battery compartment.

The device of the present invention can be employed by any musician (regardless of the instrument played) to practice any of the following musical exercises: recognizing notes, intervals, chords (triads and sevenths), scale degrees, chord progressions and melodic and harmonic dictation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

Embodiments of the present invention will be further described with reference to the accompanying drawings in which.

DETAILED DESCRIPTION OF THE INVENTION

Figure 1:
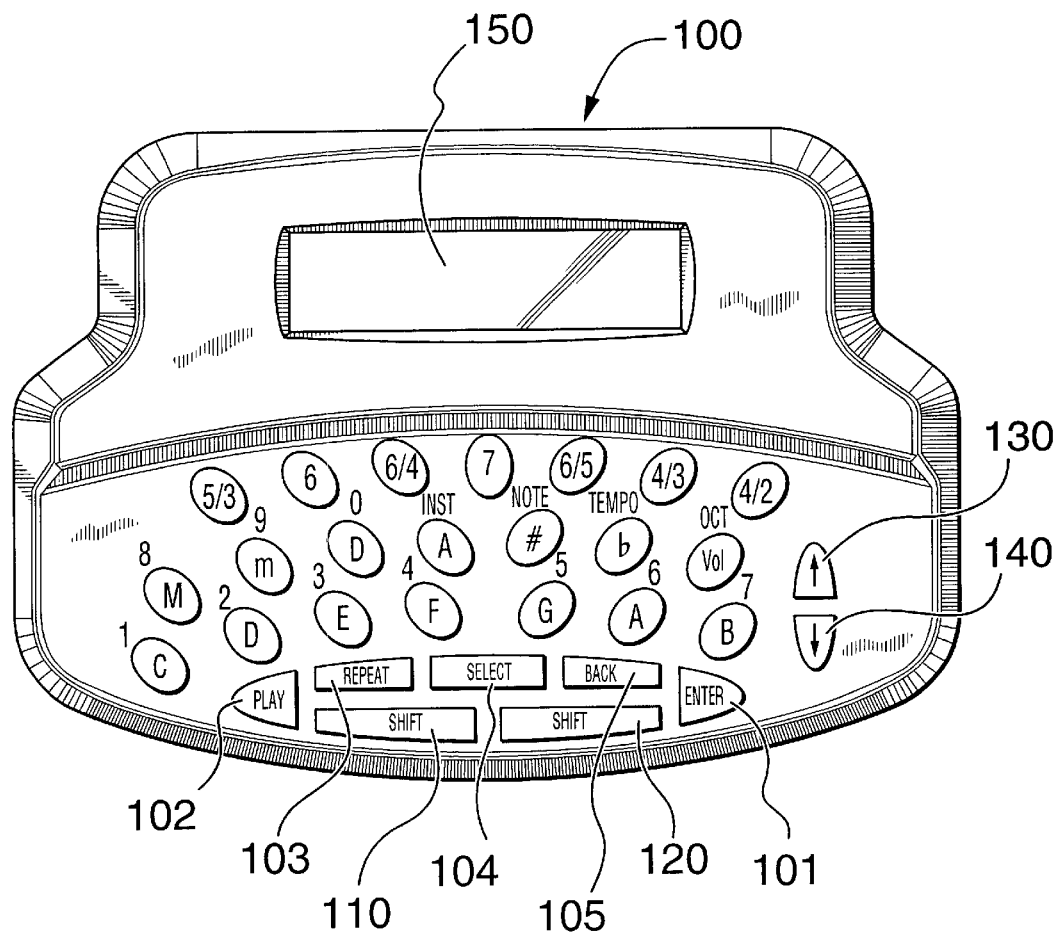
FIG. 1 illustrates an embodiment of the device of the present invention.

Although only one preferred embodiment of the invention is explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

An embodiment of portable electronic ear-training device 100 of the present invention is shown FIG. 1. The main components of the device 100 of the present invention are: a bottom and a top cover (the housing), an electronic circuit board, a keypad, and a digital display. Each of these components will now be described in a more detailed manner below.

Housing

Figure 2:
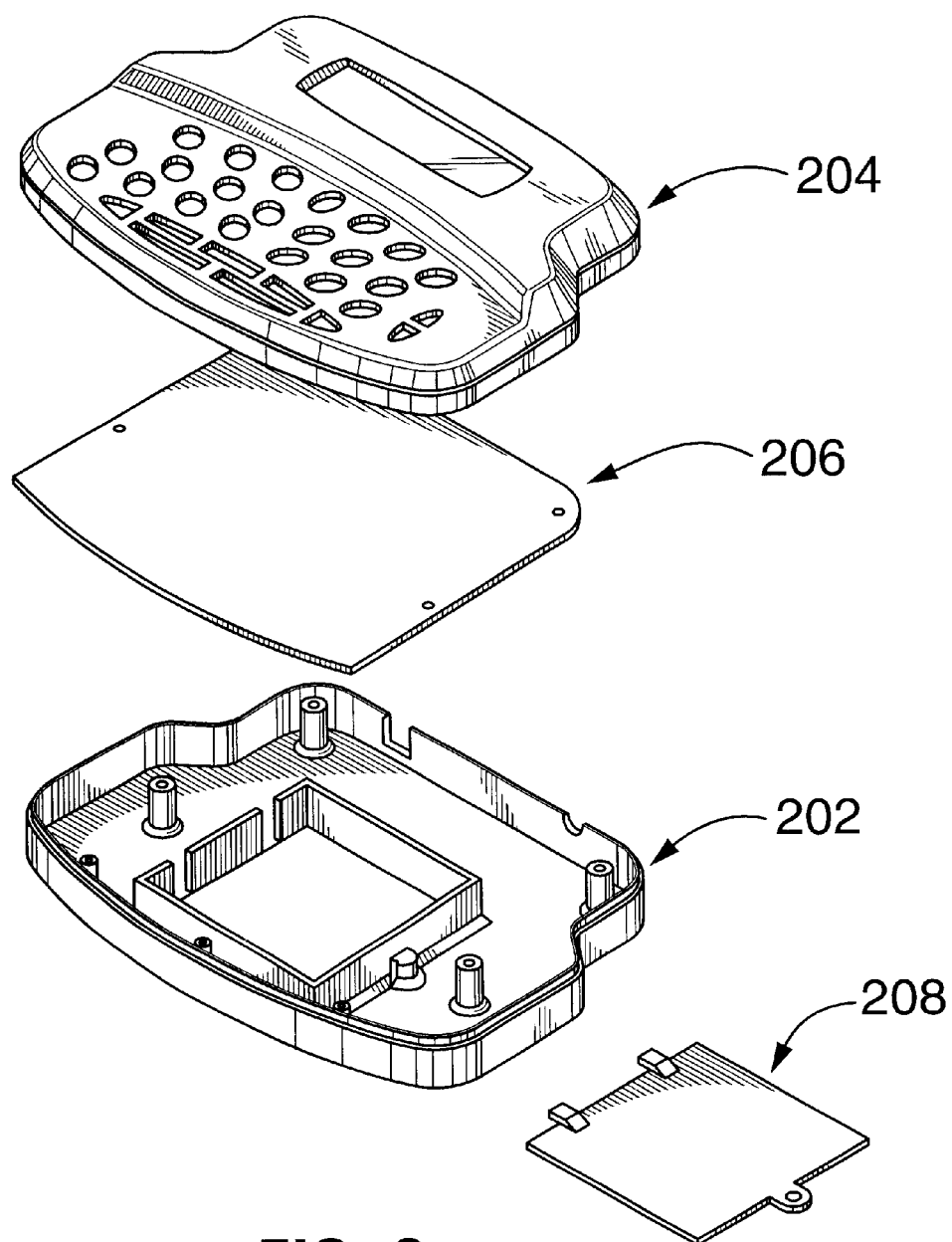
FIG. 2 illustrates an exploded view of the device in FIG. 1.

With reference to FIG. 2, the housing consists of bottom cover 202 and top cover 204. Electronic circuitboard 206 is mounted to the inside of bottom cover 202. The top cover 202, which has holes for digital LCD display (display means) 150 (shown in FIG. 1) and the buttons of the keypad, is mounted on top of the bottom cover. In the particular embodiment in FIG. 2, bottom cover 202 also comprises a battery compartment door 208.

Circuit Board

Figure 3:
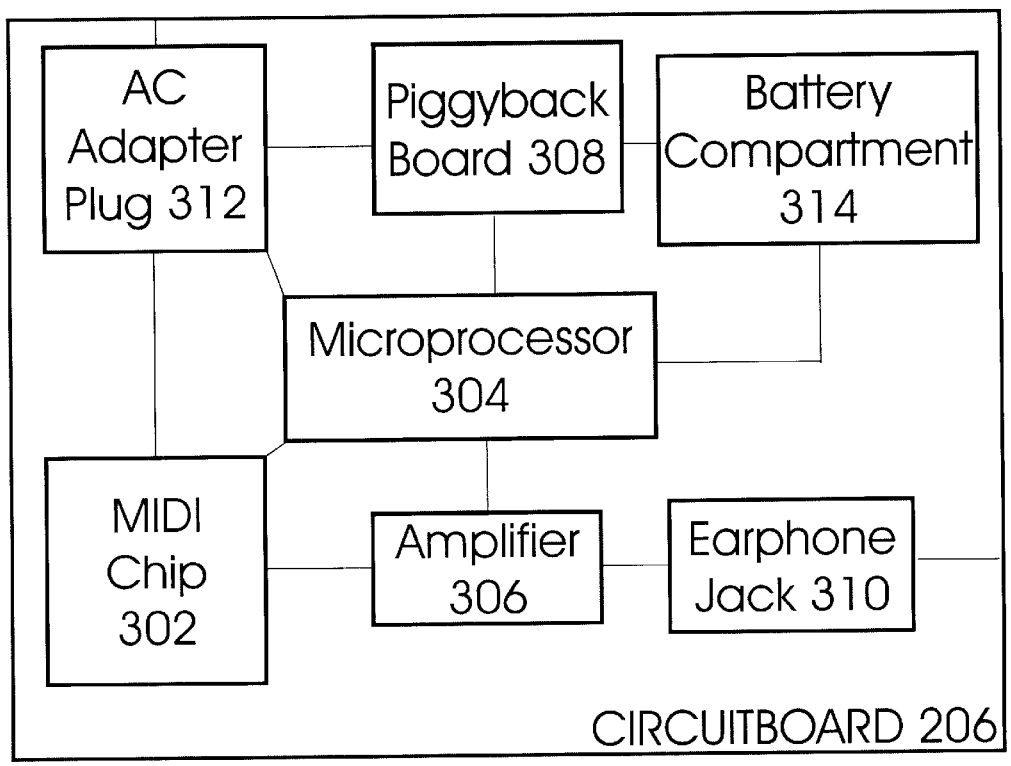
FIG. 3 illustrates a block diagram of the circuit board of FIG. 2.

With reference to FIG. 3, this circuit board 206 is mounted to the inside of bottom cover 202 (not shown) and consists of the following main components: a MIDI chip 302 (which has 127 synthesized MIDI instruments built in), a microprocessor 304, an amplifier 306, a piggyback board 308 for interfacing with the keypad buttons, an earphone jack 310, an ac-adaptor plug 312, and a battery compartment 314. The functionality of the system is relatively straightforward. A computer program (code or software) has been written which offers 7 different ear-training exercises. The functionality of the apparatus will be explained in more detail in a subsequent section of this description.

The main technological advancement which was made during the design of the apparatus of the present invention was the adaptation of computer technology (microprocessor, MIDI synthesizer chip) to a battery powered, portable, calculator-sized device. The uncertainties regarding this adaptation were: 1) How long will a 6, 9 or 12 volt battery last while powering an amplifier and MIDI chip which require high electrical current? 2) Can the adaptation be realised at a low cost? 3) Will this type of electronic, circuit generate noise and what would the cost be to filter these noises? 4) Will there be enough memory in the microprocessor to write a musically suitable software (user interface and musical exercises) and, if not, what are the costs (in terms of both money and size) in adding external memory chips? 5) Can the musical exercises be adequately presented on a 2 line, 16 character LCD display (the smallest and cheapest display available)?

A preferred embodiment of the invention utilizes a modified Motorola™ microprocessor with an 8-bit microcontroller, part number MC68HC908GP0, package QFP-44. This microprocessor was able to satisfy the memory requirements of this device. In terms of the physical characteristics of the device of the present invention, since the target market is composed of young musicians, an aesthetically pleasing enclosure with ergonomic features is preferred. The layout of the keypad buttons was designed to be easily accessible for the fingers and the housing shape is designed to fit comfortably in the hands of a user.

Keypad

The final keypad layout (see FIG. 1) was arrived at through consultation with musicians and follows musical logic. The first row of buttons is arranged so as to display the notes of the key of C major: C, D, E, F, G, A, B. These buttons also have a second function Which are, respectively, the numbers 1, 2, 3, 4, 5, 6, 7. Usually, the context is obvious as to whether the letter or the number is intended when pressing these buttons. In most situations, the software provided on the device of the present invention can ascertain, based on the context, when to expect a number. In such a context-sensitive case, a SHIFT key 110 or 120 does not have to be pressed in order to obtain the second function. For example, if a user has chosen a musical exercise with diatonic degrees, numbers from 1 to 7 are expected. In cases where the context is ambiguous, the SHIFT key 110 or 120 can be used simultaneously with a key in order to obtain a desired number.

The first four keys of the second row contain the letters "M", "m", "D" and "A" which are used to identify chord types (M=major, m=minor, D=diminished, A=augmented). The numbers 8, 9 and 0 are the second functions of the keys "M", "m" and"D". The sharp ("#") and flat ("b") keys are the fifth and sixth keys of the second row. The third row contains keys that identify chord inversions. The first three keys are for triad inversions and the last four are for seventh chord inversions.

The rest of the keys on the keypad are hotkeys. The VOL key permits a user to adjust the volume; the OCT, TEMPO and INST keys allow selection of the octave range, tempo and instrument (from a choice of 127), respectively. The NOTE key permits a user to type in a note to be played (this functions as a perfect tone or note generator). The OCT, TEMPO, NOTE and INST functions are second functions of the VOL, "b", "#" and "A" keys, respectively.

The control keys of the keypad are arranged in an elliptical shape and are: an ENTER key 101, PLAY key 102, REPEAT key 103, SELECT key 104, and BACK key 105, as well as the SHIFT keys 110 and 120. Up and down arrows 130 and 140 are on the right side of the keypad and are used to navigate through the menus.

Software is stored in the microprocessor chip 304 which enables the use of various exercises contained in the device. Once the device is turned on, by pressing the up arrow key 130, the software is executed and a menu structure is offered to the user via the digital display 150.

Figures 4A, 4B:
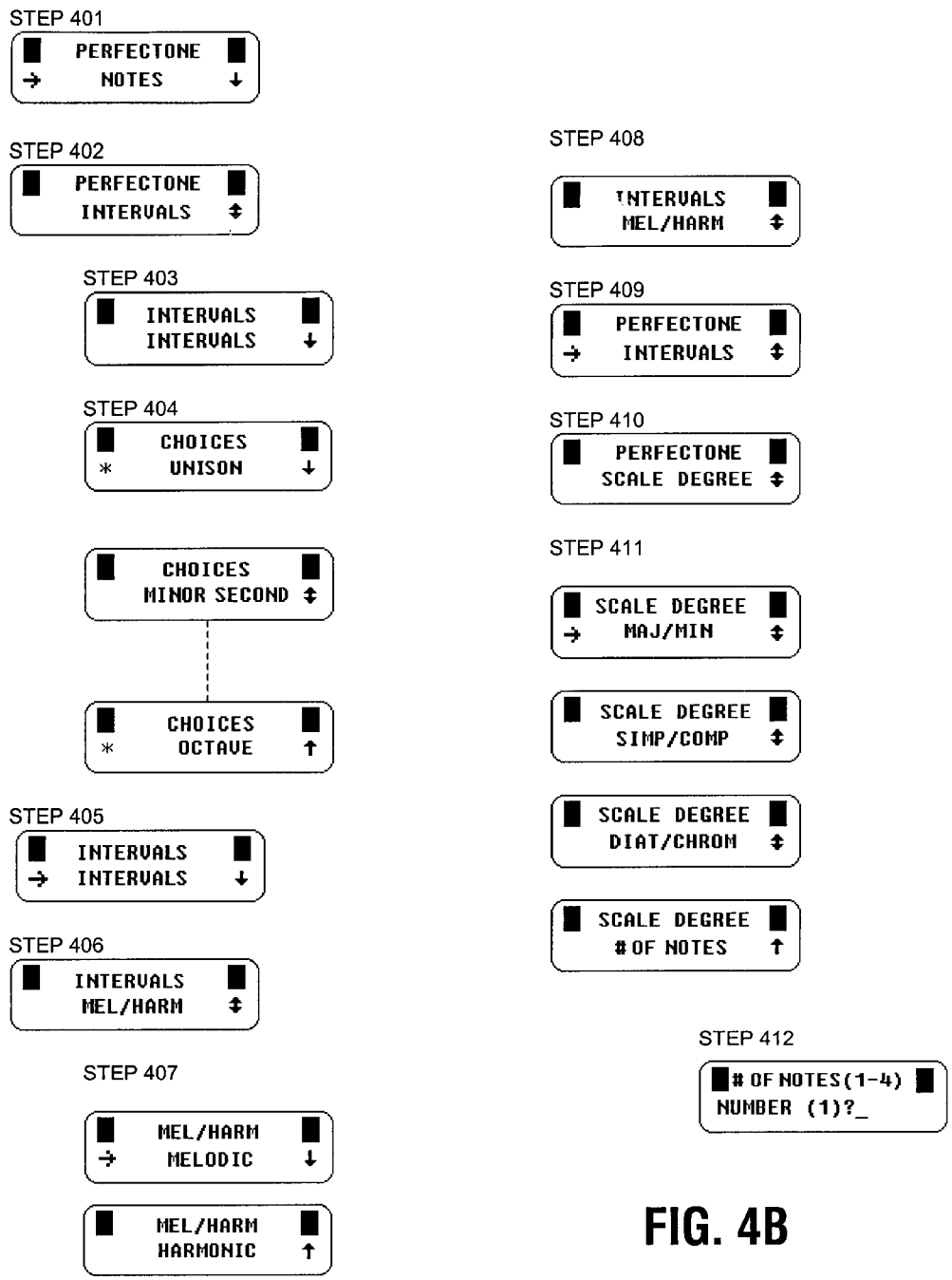
FIGS. 4A and 4B illustrate examples of menu choices provided on a display of a device according to an embodiment of the present invention.

FIGS. 4A and 4B illustrate in detail a possible navigation through the menu structure. These figures illustrate menu and sub-menu choices specifically associated with the Intervals and Scale Degree routines, each of which will be described in the detailed discussion of each of the routines provided by the device. The elements shown in FIGS. 4A and 4B are exemplary illustrations of what might be shown on a screen of digital display 150 during the navigation.

The elements in FIGS. 4A and 4B are also arranged visually so as to indicate the current menu level. For instance, steps 401, 402, 409 and 410 are aligned together on the left, which indicates that the user is at a main menu level in these steps. This main menu level is also indicated by the presence of the word "PERFECTONE", which has been used in this example as the name of the main menu, on the top line of the display. Steps 403, 405, 406, 408 and 411 are aligned together at a first sub-menu level, at one degree of indentation from the main menu level. This first sub-menu level is also indicated by the presence of the name of a particular routine or first-level sub-menu, in these cases either INTERVALS or SCALE DEGREE. Step 412 is aligned at a second sub-menu level, at two degrees of indentation from the main menu level, and one degree of indentation from the first sub-menu level. The second sub-menu level is also indicated by the presence of a second-level sub-menu name, such as # OF NOTES in 415.

In FIG. 4A, step 401 shows a screen where the main menu, here entitled "PERFECTONE", indicates the presence of the NOTES menu item. Pressing the ENTER key 101 would bring a user into the NOTES sub-menu. However, pressing the down arrow 140 permits the user to proceed from 401 to 402. Once at step 402, pressing the up arrow 130 or down arrow 140 will bring the user to the previous or next sub-menu (routine), respectively. At this point, the user is still in the main menu, but is now in a position to progress to a first-level sub-menu by pressing the ENTER key 101 in order to select the INTERVALS routine, thereby progressing to step 403. From step 403, pressing the BACK key 105 will bring the user to the main menu level of step 402, whereas pressing the clown arrow key 140 will bring the user to step 405. However, if the user wishes to enter the INTERVALS routine, this is accomplished by pressing the ENTER key 101, which will bring the user to a screen such as found in step 404.

In step 404, the user has now entered into a second-level sub-menu, which is a sub-menu of the INTERVALS routine (sub-menu). As indicated in 404, this second-level sub-menu is called CHOICES and is identified by the presence of the word CHOICES on the top line of the display. The CHOICES second-level sub-menu lists all available choices for the INTERVALS routine. The option UNISON is the first choice available in the list, whereas the option OCTAVE is the last. The user is able to scroll from one option to another with the up and down arrow keys 130 and 140 and may modify the selection with the SELECT key 104. In the specific example shown in 404, UNISON is selected (as indicated by the asterisk). Pressing the SELECT key 104 would remove the option from the list and the asterisk would disappear. Also in this example, the MINOR SECOND option is not selected. Similarly, pressing the SELECT key 104 will add the option to the list. Once all of the options are selected, the user would press the ENTER key 101 to store the selections that have been made and proceed to step 405. From step 405, as in step 403, pressing the BACK key 105 will bring the user to step 402, whereas pressing the down arrow key 140 will bring the user to step 406. In step 405, it is important to note that an arrow pointing to the right is present at the bottom left-hand corner of the display. This arrow indicates that the INTERVALS routine is the current active choice. The presence of this arrow in any of the other screens would similarly indicate the current active choice for the particular sub-menu being viewed.

Once at step 406, pressing the ENTER key 101 brings the user to another second-level sub-menu of the INTERVALS routine, as shown in step 407, which offers two choices to the user. The user may use the up and down arrow keys to go from one choice to another. The active choice is indicated by the presence of the right arrow at the left side of the screen. In this example, the active choice is MELODIC. The user may modify this active choice by pressing the ENTER key 101 when the choice HARMONIC is displayed. In that case, the user would return to step 406, which is equivalent to the display in step 408.

In step 408, the user has returned to the INTERVALS first-level sub-menu. Pressing the BACK key 105 will bring the user to step 409, which is the main menu level. Note that in step 409, the right arrow on the left side of the screen indicates that INTERVALS is the active choice, i.e. it was the last item selected. Pressing the down arrow key 140 will bring the user to step 410, in which the option of the SCALE DEGREE routine is shown. From step 410, pressing the ENTER key 101 will bring the user to step 411, which shows the first-level sub-menu associated with the SCALE DEGREE routine.

In step 411, the user is now in the SCALE & DEGREES sub-menu. As before, pressing the BACK key 105 will bring the user to step 410 and the main menu level. Pressing the up and down arrow keys 130 and 140 will permit the user to navigate through the various options in the SCALE & DEGREES sub-menu, as shown in the screens in step 411. A user may press the ENTER key 101 in order to proceed to step 412 and into the # OF NOTES second-level sub-menu. As shown in 412, the user is prompted to enter a number of notes that will be played after the scale in this particular musical exercise. The number in parentheses represents the last selection. The user may enter the selection by pressing any one of numbers 1 to 4 on the keypad. Pressing ENTER key 101 will store the entry, bringing the user back to step 411 to confirm that the entry has been stored. At this point, the user has set up all of the necessary options in order to play the desired customized musical exercise.

Turning back to FIG. 3, depending on the user's menu selections, the MIDI chip 302 is instructed to play different randomly selected musical elements which are first amplified in the amplifier 306 and then channeled to the user's earphones via the earphone jack 310. The user is then prompted on the digital display 150 to identify the musical elements being played by pressing the appropriate keypad buttons. When buttons are pressed, electrical contact is made on the piggyback board 308 and a signal is sent to the microprocessor 304. A message is then displayed informing the user whether a correct answer was given. In the case of a wrong answer, the user can try again. The present invention can be powered by batteries installed in the battery compartment 314, or by plugging an ac-adaptor into the ac-adapter plug 312.

All routines have at least one sub-menu. As in the main menu, the arrow keys enable scrolling through the sub-menu items and the ENTER key 101 allows the selection of a particular item. To exit a sub-menu, press the BACK key 105. It is also possible to control the volume, to select octaves, to set the tempo, to choose the instrument, and to hear a specific note by using the hotkeys, as previously discussed.

Sub-menus may offer from two to three options. In these sub-menus, a right arrow displayed on the left side of the screen indicates the current option. To change this option, simply press the ENTER key 101 after having reached the desired option with the up and down arrow keys 130 and 140. When the option "random" is available, this means that the device randomly selects one of the options in the list. Every routine has a default choice that is reset every time the machine is turned on.

In some routines, a sub-menu may offer the possibility of modifying a list of selections such as notes, intervals, triads or seventh chords. For each of these lists, the choices are displayed one at a time, and the arrow keys are used to move from one choice to another. The asterisk character (*) denotes the selected choices. If no asterisk is shown, no choice is selected. To add a choice to the list of selected choices, press the SELECT key 104. Also use the SELECT key 104 to remove already-selected choices from the list. Once the user has made the selections in the list, the ENTER key 101 is pressed to save the selections. This new list of choices will be kept in memory as long as it is not changed and until the device is turned off.

When an answer to an exercise is required of the user, the octave of a note may be entered but this information will not be considered when determining whether the answer is correct. Generally, when the device prompts the user for an answer to an exercise, the BACK key 105 is used to erase an answer, the REPEAT key 103 is used to replay the exercise, and the ENTER key 101 is used to confirm an answer. If the entered answer is wrong, the device prompts again for another answer. If no answer is given, the answer is shown immediately if the ENTER key 101 is pressed. At this stage, the user can replay the exercise by pressing the REPEAT key 103; pressing the ENTER key 101 returns the user to the routine sub-menu, and pressing the PLAY key 102 begins a new exercise.

With respect to the specific features and how they are achieved with the present invention, the following exercises or routines are available: notes; intervals; scale and degree; chords and sevenths; and melody and rhythm.

NOTES Routine

In this routine, the device plays a randomly selected note from a list of user-specified notes. If all 12 notes of the chromatic scale are selected on this list, this routine becomes a perfect pitch, or absolute pitch exercise. When a more limited range of notes is selected, the exercise is more of a relative pitch exercise since the selected notes are known. The selection of a new notes list can be made from a menu called NOTES CHOICE, which may be modified.

When the PLAY key 102 is pressed, a single note will be played, the note being randomly selected from the list in NOTES CHOICE. The device then prompts the user for the name of the note that was played.

INTERVALS Routine

In this routine, the device plays an randomly chosen interval from a list of user-selected intervals. As mentioned previously, FIGS. 4A and 4B illustrate a possible navigation through this routine's menu and sub-menus.

The INTERVALS sub-menu enables the user to modify the list of the intervals that may be heard. The MEL/HARM sub-menu provides the choice between a melodic interval (one note played after the other) or a harmonic interval (both notes played simultaneously). The SIMP/COMP sub-menu provides the choice between an interval that will be less than an octave (simple) or a larger interval (compound). The ASC/DESC sub-menu provides the choice between an ascending interval or a descending interval, which is particularly useful for melodic interval exercises.

When the PLAY key 102 is pressed, an interval will be played randomly, the interval being selected from the INTERVALS list. The first note of the interval is always displayed. The present invention prompts you for the name of the second note that was played.

SCALE & DEGREE Routine

In this routine, the device plays a rising major or minor scale in a key randomly selected among all possible musical keys. Shortly thereafter one, two, three or four notes will be played, depending on the desired exercise. If these notes are selected from the scale, this routine becomes an exercise on the recognition of the scale degree. However, if these notes are selected from the twelve possible notes, this exercise is more of an "absolute pitch" exercise since the played scale provides a tonal context. The MAJ/MIN sub-menu provides a choice of whether the scale will be major or minor. The minor scales are harmonic minor scales, meaning that the sixth and the seventh degree are lowered by a semitone. The NOTE NUMBER sub-menu provides a choice of how many notes will be played after the scale. The range of choice is from one to four notes. The DIAT/CHROM sub-menu provides a choice of whether the notes played after the scale will be chosen among the degree of that same scale (diatonic) or whether they will be chosen among the twelve possible notes (chromatic). The SIMP/COMP sub-menu provides a choice of whether the notes to be played are to be inside the octave of the played scale (simple), or if some of the notes will be in adjacent octaves (compound).

When the PLAY key 102 is pressed, a scale will be played, followed by a certain number of notes as selected by the user. The user must then determine the identity of the notes or degrees that were played. If diatonic degrees have been chosen, numbers from 1 to 7 are expected as the answer. The shift key is not needed when entering the number because the device knows by the context when to expect numbers and adjusts its keyboard accordingly. On the other hand, if chromatic degrees have been chosen, note names are the expected answers. The note names should be entered in the order in which they were played, pressing the ENTER key 101 between each note identification. When the correct answers are displayed, the scale keynote is provided, followed by its mode and finally, the note(s) that have been played.

CHORD AND SEVENTH Routines

In these routines, the device plays a chord (triad or a seventh) randomly chosen from a list of user-specified chords.

The CHORD/SEVENTH routine enables modification of the list of the chords that may be heard. In the CHORD portion of this routine, the DOUBLE sub-menu allows the user to enable or disable doublings in the chords. By default, the chords have no doublings.

The CHORD+NOTE sub-menu enables the selection of whether or not the played chord will be followed by a note from the chord. The OPEN/CLOSE sub-menu enables the user to specify whether the chord is to be in an open form, or in a closed form.

When the PLAY key 102 is pressed, a chord will be played, the chord being randomly selected from the list CHORDS/SEVENTH. This chord will be followed by a note if the user has selected this option.

The expected answer is an identification of the type of chord. If the chord is followed by a note, the user may scroll a list containing the options ROOT, THIRD, FIFTH and SEVENTH (for the SEVENTH routine); the user identifies the desired answer by pressing the ENTER key. When the correct answer is displayed, the root of the chord is given, as well as its type and its inversion. If the CHORD+NOTE is enabled, the pitch of the note will be displayed as well.

MEL&RYT Routine

In this routine, the device will play a two bar melody in a meter of the user's choice. It is recommended to write the dictation down on paper since the device will only display the answer and will not evaluate the user's answers for this routine.

The MELODY sub-menu provides a choice between a melodic dictation, a rhythmic dictation, or both. The METER sub-menu enables the user to select a dictation meter. A meter can be selected by scrolling through the list of possible meters (there are six) and pressing on the ENTER key 101 once the desired meter has been reached. If no choice is made in his sub-menu, the dictation will be given in ¾ time. The KEY sub-menu provides a choice of the key of the dictation. The MAJ/MIN sub-menu provides a choice of either major or minor mode.

When the PLAY key 102 is pressed, a tonic chord will be played, then the beat will be played for one bar, and finally the two-bar dictation will be played. For a melodic dictation, the user only needs to write down the notes that are played. For the rhythmic dictation, only the rhythm need be considered even if a melody is played. To repeat the same exercise, press the REPEAT key 103. Pressing the ENTER key 101 will display the answers.

The answers will be displayed one element at a time (a note for the melodic dictation, and a note duration for the rhythmic dictation). To go to the next element, press the ENTER key 101, and to go back to the previous note(s) use the BACK key 105. If a melodic and rhythmic dictation have been chosen, the melodic dictation answers will be given before the rhythmic answers.

During the answer giving process, the dictation may be replayed by pressing the REPEAT key 103. Pressing the PLAY key 102 during the answer giving process will start a new exercise.

Chord PROGRESSIONS Routine

This routine plays chord progressions.

The sub-menu entry # OF CHORDS provides a choice of either four, eight or twelve chords for the progression. The sub-menu KEY enables the selection of the key in which the chord progression will be generated and the sub-menu MAJ/MIN allows the selection of either a major or minor tonality. The CHORDS sub-menu offers a list of chords that can be selected (all the triads present in the TRIADS routine and the SEVENTHS routine as well as all the possible inversions are listed) for the progressions.

When the PLAY key 102 is pressed, a progression of 4, 8 or 12 chords will be played. The REPEAT key 103 replays the progression and the answers are displayed after the ENTER key 101 is pressed. The chords are displayed one at a time and are described by the degree of the scale which is the root of the chord, its type (major, minor, diminished, . . . ) And its inversion. Pressing the ENTER key 101 will display the next chord. Pressing the BACK key 105 allows a review of previous chords. At all times during the answer displaying process, the chord progression can be replayed by pressing the REPEAT key 103. Pressing the PLAY key 102 will launch a new exercise and chord progression.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A portable electronic musical device comprising:
   a housing;
   a processor contained within said housing for providing randomly generated customizable interactive music ear-training exercises to a user;
   input means connected to said processor and located on an exterior surface of said housing for receiving input selection by the user;
   sound generating means connected to said processor for generating sounds to be used in said exercises;

display means located on an exterior surface of said housing for displaying musical exercise information; and said processor providing perfect pitch exercises.

2. A portable electronic musical device comprising:

a housing;

a processor contained within said housing for providing randomly generated customizable interactive music ear-training exercises to a user;

input means connected to said processor and located on an exterior surface of said housing for receiving input selection by the user;

sound generating means connected to said processor for generating sounds to be used in said exercises;

display means located on an exterior surface of said housing for displaying musical exercise information; and said processor providing randomly generated musically correct, mathematically calculated chord progressions.

3. The device according to claim 1, wherein said processor provides full control to the user over the level of difficulty of the exercises.

4. A portable electronic musical device comprising:

a housing;

a processor contained within said housing for providing randomly generated customizable interactive music ear-training exercises to a user;

input means connected to said processor and located on an exterior surface of said housing for receiving input selection by the user;

sound generating means connected to said processor for generating sounds to be used in said exercises;

display means located on an exterior surface of said housing for displaying musical exercise information; and said processor providing testing capability such that the device corrects answers given by the user via said input means.

5. The device according to claim 1, wherein said processor provides musical exercises selected from the group of: recognizing notes, intervals, chords, scale degrees, chord progressions, melodic dictation, harmonic dictation, rhythmic dictation, chord identification, melodic intervals, and harmonic intervals.

6. The device according to claim 1, further comprising an electronic circuitboard contained within said housing and connected, at least, to said processor.

7. The device according to claim 1, wherein said sound generating means comprises a musical instrument digital interface chip.

8. The device according to claim 7, wherein said musical instrument digital interface chip provides a choice of 127 different MIDI instruments for the musical exercises.

9. The device according to claim 1, wherein said sound generating means comprises an amplifier.

10. The device according to claim 1, wherein said sound generating means comprises an earphone jack for outputting sound to a user.

11. The device according to claim 1, wherein said input means comprises a keypad mounted on an exterior surface of said housing.

12. The device according to claim 6, wherein said input means comprises a keypad mounted on an exterior surface of said housing.

13. The device according to claim 12, further comprising a piggyback board connected to said keypad and to said electronic circuit board for interpreting selections input by the user.

14. The device according to claim 11, wherein said keypad comprises a plurality of buttons some or all of which can be used to perform more than one function.

15. The device according to claim 14, wherein the functions of some or all of said buttons are determined automatically based on the context of the particular exercise being used.

16. The device according to claim 14, wherein some of said buttons are elliptical in shape.

17. The device according to claim 1, wherein said display means is a liquid crystal display.

18. The device according to claim 1, further comprising an ac-adapter plug connected at least to said processor and for further connection to an ac-power supply so as to facilitate power to said processor.

19. The device according to claim 1, further comprising a battery compartment having electrical contacts connected at least to said processor and for further connection to a battery power supply so as to facilitate power to the processor.

20. A method for musically ear-training a user by way of a portable electronic musical device, which includes a housing, a processor contained within said housing for providing randomly generated customizable interactive music ear-training exercises to the user, input means connected to said processor and located on an exterior surface of said housing for receiving input selection by the user, sound generating means connected to said processor for generating sounds to be used in said exercises, display means located on an exterior surface of said housing for displaying musical exercise information, said method comprising the steps of:

providing, by way of said processor a plurality of customizable interactive musical exercises for selection by the user;

receiving, by way of said input means, user-defined options related to a selected musical exercise;

playing the selected musical exercise on the apparatus by way of said sound generating means;

prompting the user, by way of said display means, for an answer to the musical exercise;

providing the correct answer to the musical exercise to the user by way of said display means; and some or all of said musical exercises have at least one sub-menu which presents a plurality of options to the user relating to customization of a selected musical exercise.

* * * * *